Figure 6:
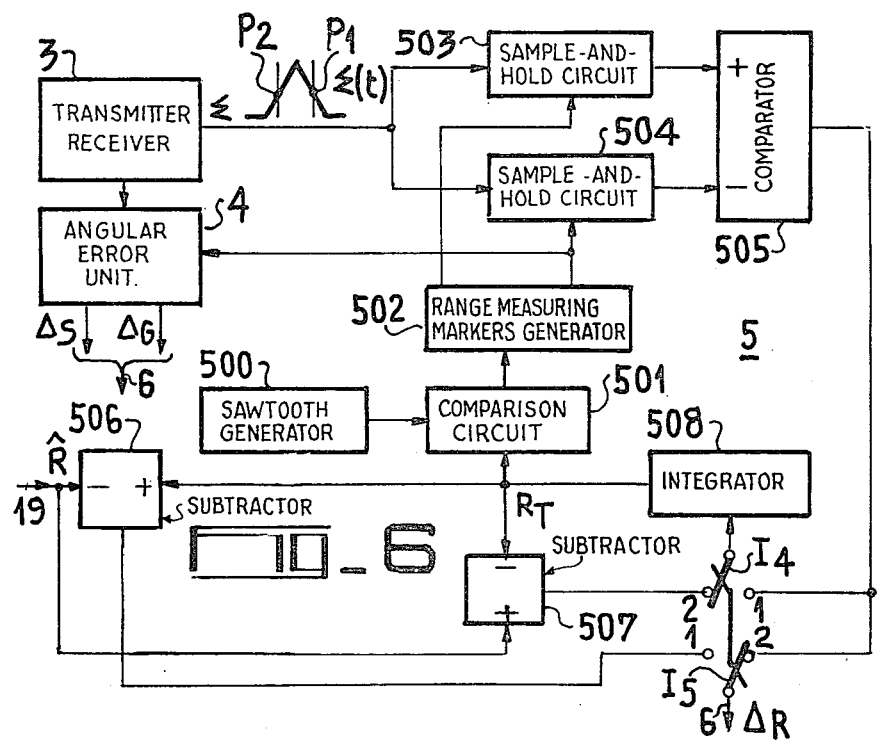

United States Patent [19]

Gendreu

[11] 4,148,026
[45] Apr. 3, 1979

[54] SYSTEM FOR TRACKING A MOVING TARGET

[75] Inventor: Robert Gendreu, Paris, France

[73] Assignee: Thomson-CSF, Paris, France

[21] Appl. No.: 870,250

[22] Filed: Jan. 17, 1978

[30] Foreign Application Priority Data

Jan. 21, 1977 [FR] France .................. 77 01740

[51] Int. Cl.² .............. G01S 9/22; G01S 9/62; G01S 9/66
[52] U.S. Cl. .................. 343/5 ST; 343/7.4; 343/7.3; 343/16 M; 235/409; 235/410; 235/411; 250/203 R; 356/152
[58] Field of Search ........ 343/16 M, 7.4, 5 ST, 343/7.3, 9; 235/411, 410, 409; 250/203 R; 356/152

[56] References Cited

U.S. PATENT DOCUMENTS

| | | | |
|---|---|---|---|
| 3,123,822 | 3/1964 | Shelley et al. | 343/7.4 |
| 3,223,996 | 12/1965 | Voles | 343/5 ST |
| 3,368,217 | 2/1968 | Musso | 343/5 R |
| 3,680,086 | 7/1972 | Valstar | 343/5 ST |
| 3,705,936 | 12/1972 | Wilmot et al. | 343/5 DP |
| 3,750,174 | 7/1973 | Belluck | 343/7.4 |
| 3,798,425 | 3/1974 | Heard et al. | 235/411 |
| 3,821,738 | 6/1974 | Quesinberry et al. | 343/16 M |
| 3,952,304 | 4/1976 | Broniwitz et al. | 343/16 M |

Primary Examiner—Maynard R. Wilbur
Assistant Examiner—Lawrence Goodwin
Attorney, Agent, or Firm—Cushman, Darby & Cushman

[57] ABSTRACT

A system for tracking a moving target from a moving carrier. The system is provided with an arrangement allowing a measurement of the position of the target in relation to the carrier. The difference between the position of the target and an estimated position for the latter is given by this arrangement, generally in spherical co-ordinates. These spherical co-ordinates are changed by a co-ordinates converting unit into cartesian co-ordinates. The position of the target is given in turn in relation to a cartesian frame of reference of unvarying orientation whose origin is situated close to the instantaneous centre of rotation of the carrier in relation with a trajectory simulator. The frame of reference is then changed in the opposite direction for a control of the position of the measuring arrangement.

23 Claims, 8 Drawing Figures

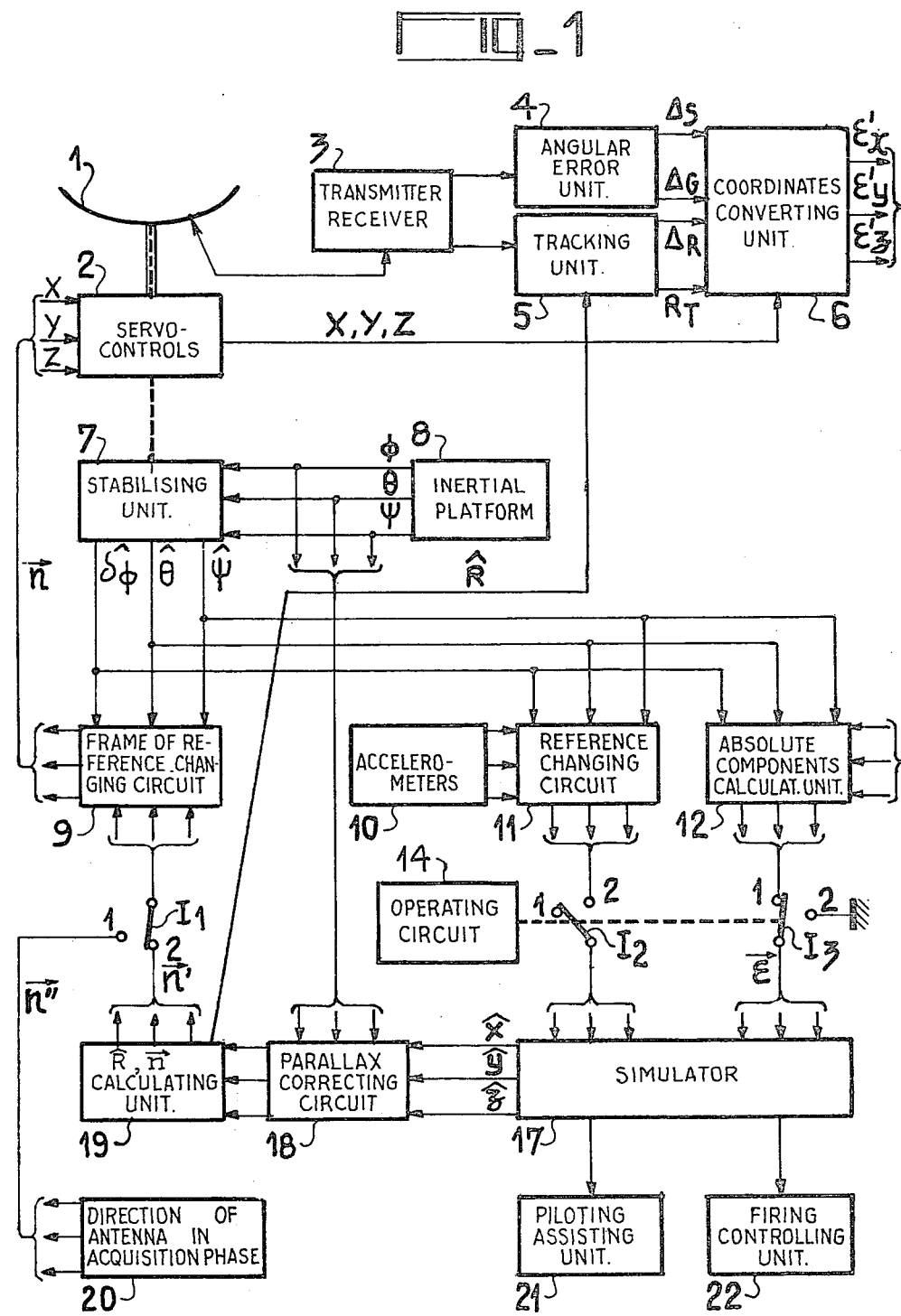

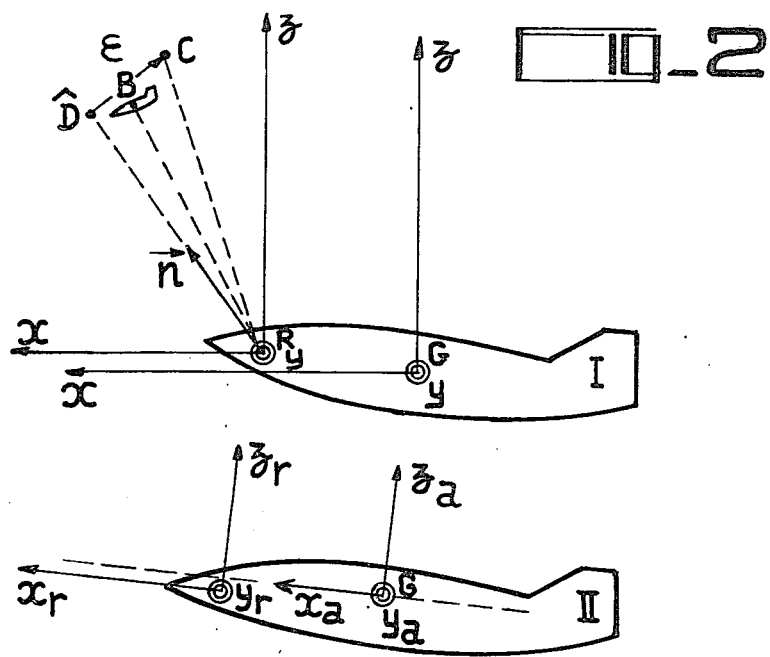
FIG_2
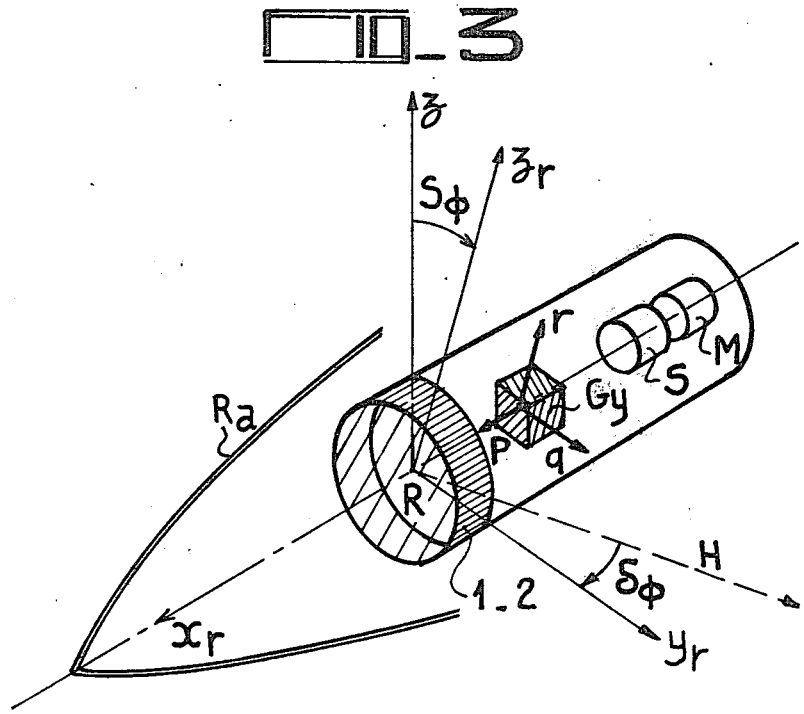
FIG_3

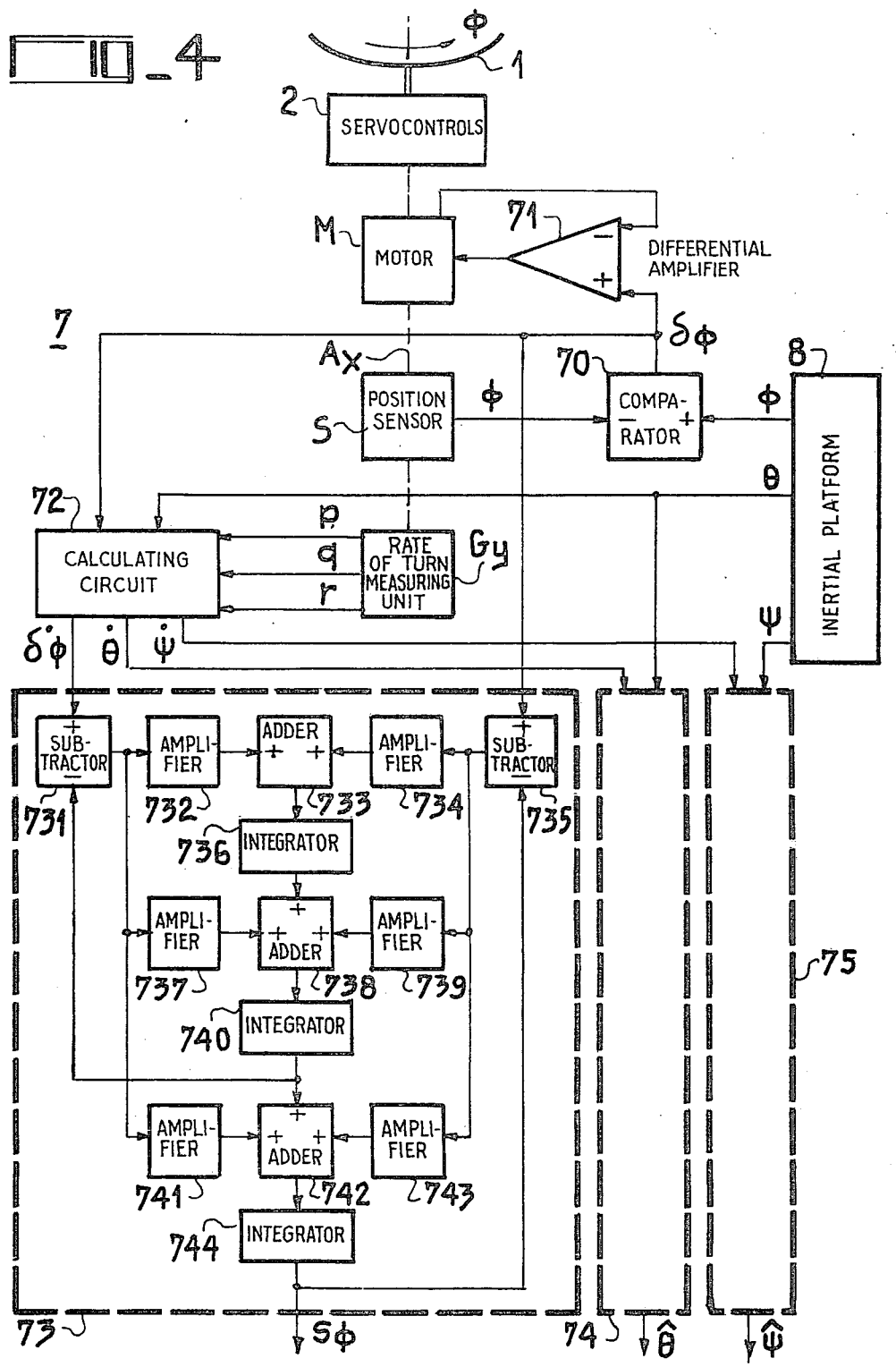

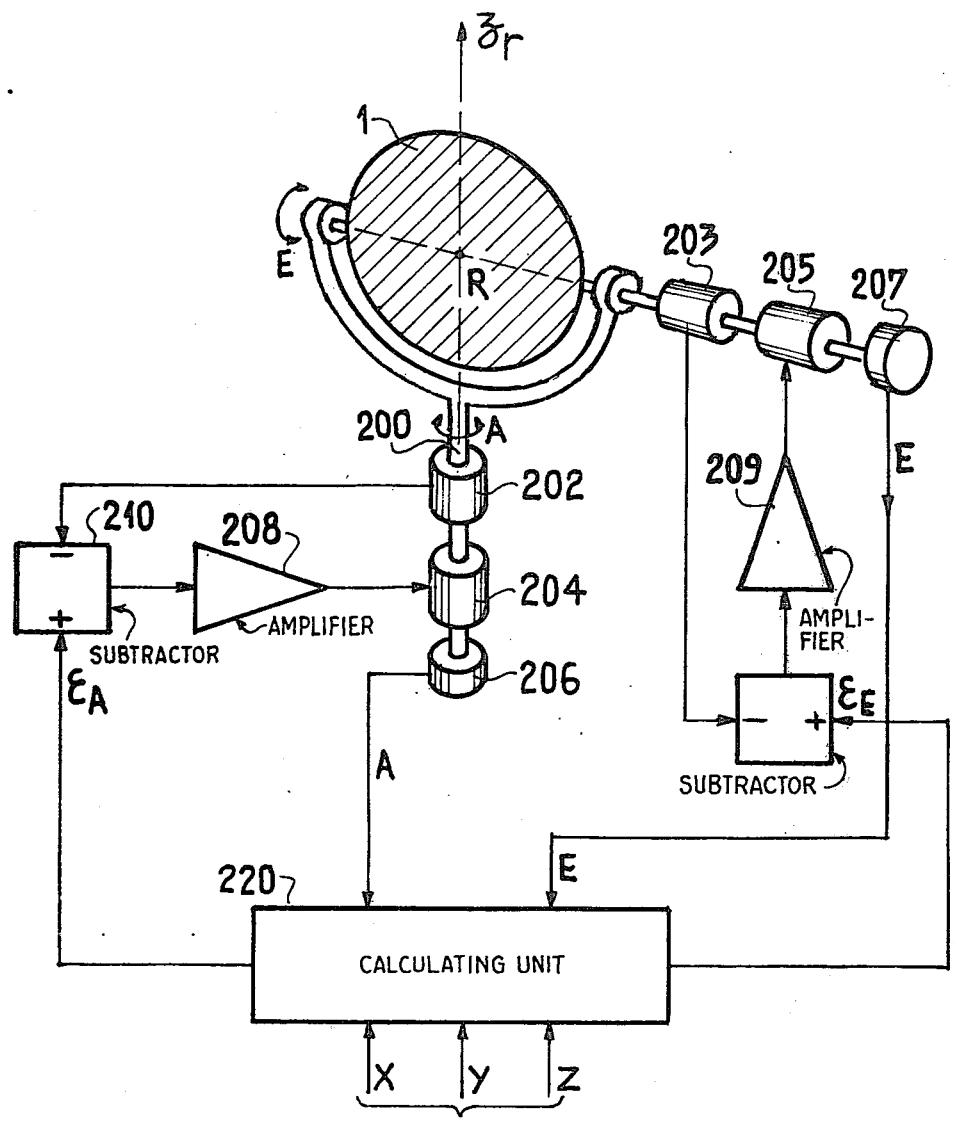
FIG_5

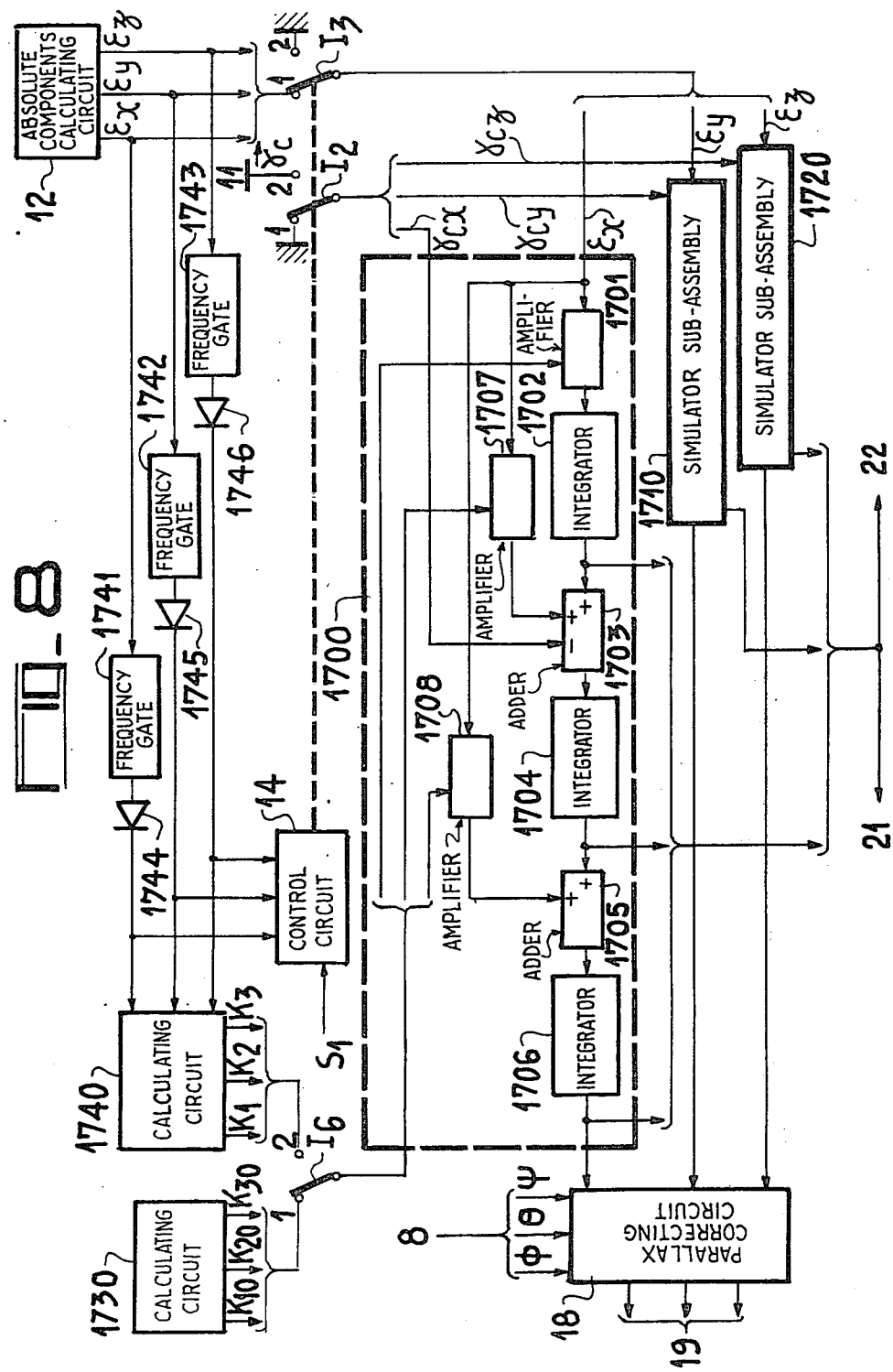

SYSTEM FOR TRACKING A MOVING TARGET

This invention relates to systems for tracking and measuring the position of a moving target; the systems themselves being moving. It relates in particular to airborne radar systems but also to systems on the ground or on board terrestrial or marine carriers.

Systems of this kind incorporate a position measuring device whose position is servocontrolled in such a way that it remains trained on the target. If, for example, it is a radar which is concerned, the measuring device is formed by an antenna of the monopulse kind which is associated with a transmitter and a receiver to supply range measuring signals and signals representing angular divergence from the axis of the antenna. These measurement signals are utilised by servocontrols which control the position of the antenna in such a way as to reduce the error signals.

Each measurement which is made is subject to an error. This is the statistical or measurement noise error, leaving aside system errors. The measurement is generally too great to allow the antenna to be accurately positioned from only one measurement. The noise is attenuated by taking the mean of a number of successive measurements, by integrating the signals for example. Simply by the fact of their mechanical inertia, the devices for servocontrolling the antenna perform processing of this nature to some degree. Reducing the measurement noise thus amounts to reducing the pass band of the system. The smaller the pass band the smaller are the statistical errors after processing. However, the processing necessarily involves a delay in carrying out the servocontrol actions on the antenna. This delay is more of a nuisance the faster the speed at which the target is maneouvring and a second error then makes its appearance namely, the dynamic error.

To sum up, the kinematic parameters of any target whatever tracked by a system are only known with an errow, which is the resultant of the statistical error after processing and the dynamic error.

To achieve the minimum resultant error, it is known to seek a compromise between a sufficiently narrow pass band in the processing and servocontrol circuits, which entails a small statistical error after processing but, unfortunately, a large dynamic error, and a sufficiently wide pass band, which entails the opposite. This compromise is all the more difficult to put into practice in that the solution which is adopted is not applicable in every case. In effect, if the target is far away, the measurement noise and the angular movement of the target are small, and this allows a narrow pass band with an acceptable dynamic error. On the other hand, when range decreases it is necessary to increase the pass band to reduce the dynamic error but at the same time this increases errors due to measurement noise.

The accuracy of such systems is thus fairly limited, being 4 meters for position and 10 meters per second for speed for a target 1 kilometer away for example.

The measurement system according to the invention does not suffer from these drawbacks and restrictions. It removes a large part of the measurement noise which is due to the conditions under which such measurements are normally made. The fact is that the measurements are made at a point distant from the centre of gravity of the carrier or its instantaneous centre of rotation and represent spherical coordinates referred to a moving frame of reference. These coordinates are not independent of one another and, what is more, they depend on the attitude of the frame of reference. The frame of reference however is subject to high-speed translatory and rotatory movements due to vibration, torsion and rotation of the carrier and to the servocontrol mechanisms. In accordance with the invention, the measurements which are made by the system are converted into cartesian coordinates and are referred to a frame of reference whose orientation does not change and whose centre is close to the centre of gravity of the carrier or to its instantaneous centre of rotation. Since this frame of reference is subject only to translatory movements, the measurements are divested of a large part of their noise, which allows the processing circuits to have a narrow pass band.

In accordance with a feature of the invention, measurements which are made in spherical coordinates with a frame of reference relating to the measuring members are converted into cartesian coordinates and reference changing circuits are arranged upstream and downstream of the processing circuits so that the said processing takes place with a frame of reference whose orientation is substantially unvarying and whose origin is situated substantially at the instantaneous centre of rotation of the moving object carrying the system.

In this frame of reference, the effective value of the measurement noise due chiefly to the movement of the high spot on or near the target is not a variable and the kinematics of the target may also be considered as unvarying. It is then possible to make a genuine simulation of the trajectory of the target with a certain amount of prediction rather than simply processing the signals by integration. This simulation enables small dynamic errors to be obtained.

Furthermore, since the pass band of the system which makes use of this simulation is narrow, the loss of a part of the measurement information has no influence or only a slight influence on the results, by virtue of the memory function of the simulator. The loss of the measurement information may thus be deliberate, as a result of the suppression of manifestly incorrect measurements, which reduces still further the statistical errors after processing, or in the course of certain tactical manoeuvres by the carrier.

Figure 7:
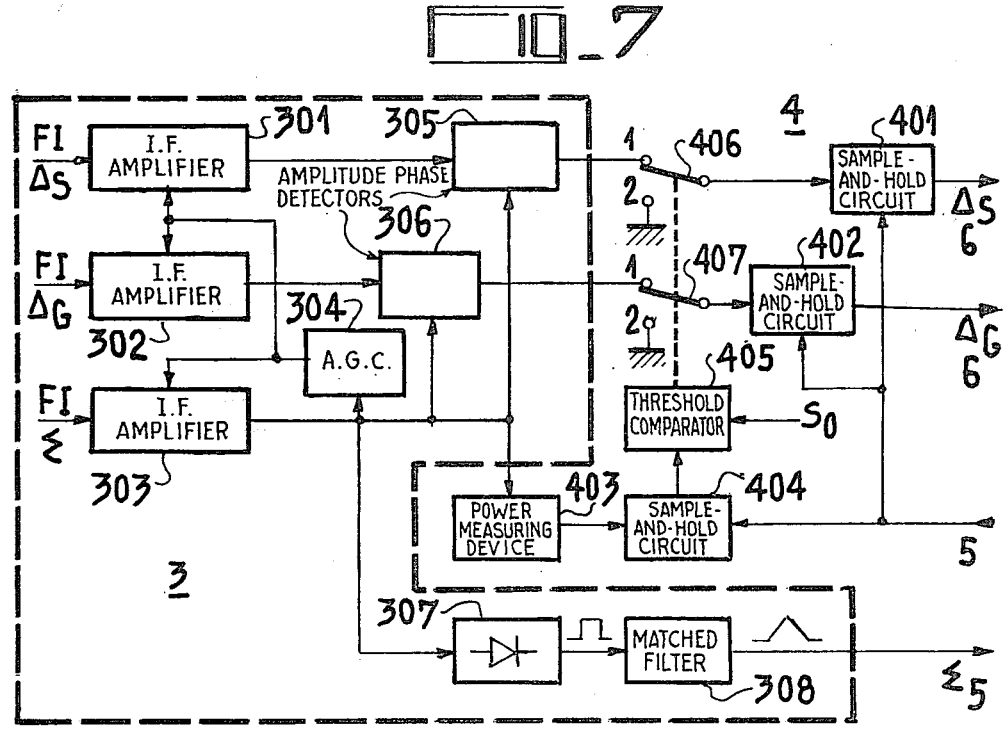

Other features and advantages of the invention will become apparent from the following description, which relates mainly to an airborne radar system. This description is illustrated by the Figures, which show:

FIG. 1, a general block diagram of a radar system according to the invention,

FIG. 2, the reference frames for measurement and processing,

FIG. 3, the roll stabilising unit of the radar,

FIG. 4, the various circuits of the roll stabilising unit,

FIG. 5, the unit for servocontrolling the antenna of the radar directionally,

FIG. 6, the circuits for measuring range errors,

FIG. 7, the circuits for measuring angular errors, and

FIG. 8, the circuits of the trajectory simulator.

The diagram shown in FIG. 1 is that of a tracking radar installed on board an aircraft. This radar is intended to pick up echos from a given target (another aircraft for example). It has a movable antenna 1 of the monopulse type, that is to say an antenna which enables measurements to be made of angular differences between the direction of the target and its projections onto two mutually perpendicular planes of symmetry. At the same time the radar measures the distance which separates the carrier aircraft from the target. The antenna, being movable in relation to the carrier, needs to be steered permanently in the direction of the target by the trajectory simulator and needs to be so steered as independently as possible of angular movements by the carrier. To do this, the steering is performed by servo-controls 2. These servocontrols are operated by a processing loop using measurements of the above mentioned differences. The gain of this loop has to be sufficiently great for the differences measured to be as small as possible and it needs to have a narrow pass band in order to eliminate noise from the measurements as far as possible and thus be subject to the minimum statistical error. The processing must not of course be achieved at the expense of dynamic error. This is why the processing loop contains simulating circuits 17 which at all times calculate the estimated kinematic parameters of the target (acceleration, speed, position) in relation to the carrier aircraft.

In accordance with a feature of the invention, the results set forth above are achieved by means of preprocessing, coordinate changing and frame of reference changing circuits in such a way that the simulating circuits 17 make use of parameters which are free of a large part of their noise. In particular these circuits enable the noise due to movements of the carrier to be eliminated, which noise could not have been eliminated by filtering since its spectrum is narrower than that of the noise due to the movements of the high spot of the target. Furthermore, and this is an important point, these parameters have a narrow spectrum independent of the measurement noise of the radar, that is to say they change relatively slowly with time, whatever the attitudes of the carrier aircraft and the target.

FIG. 2 shows the three-axis frames of reference employed in the system. The carrier aircraft is shown twice at I and II, although the aircraft concerned is the same. It carries a radar system which is situated forward at R. At II are shown the three-axis cartesian frames of the aircraft which relate to the radar (R, xr, yr, zr), and to the centre of gravity G of the aircraft (G, xa, ya, xa) or better to the instantaneous centre of rotation of the aircraft. At I are shown three-axis cartesian frames (x, y, z,) which are centred at R and G and which are parallel to an absolute cartesian reference.

The target is situated at B, but the noise-distorted measurements performed by the radar indicate a position C for the target. After processing, the estimated position of the target is $\hat{D}$ and its direction is represented by a unit vector $\vec{n}$.

The measurements made by the radar are made in the aircraft frame of reference (R, xr, yr, zr) and these measurements are relative to the radar. Furthermore, they are made with spherical coordinates (range, elevation and azimuth). The use of such coordinates to operate servocontrols has many disadvantages. The coordinates are not independent of one another. The calculation of speed and position is complicated and it is very difficult to design trajectory simulation based on a simple model. If the same measurements are considered in an absolute cartesian frame of reference they reflect the kinematics of the target independently of those of the carrier aircraft. However, the kinematics of the target in an absolute cartesian reference are equal to the resultant of those of the target measured with respect to the radar-related-reference and those of this reference relative to the aforesaid absolute cartesian frame of reference. The radar-related reference frame has its origin in the noise of the aircraft. The latter is subject to vibration and distortion due to the flexibility of the fuselage, over and above the actual movements of the aircraft in rotation, translation and so on. The measurement made in the radar frame of reference are thus marred by a first error consisting of a known part (parallax) which is due to the movements of the radar reference frame in relation to an absolute cartesian reference, and by a second error due to the in situ flickering of the target (an equally cartesian phenomenon). One of the objects of the invention is to remove these errors by referring the measured information to a predetermined cartesian reference which is as stationary as possible.

It is not desirable to select a cartesian reference related to the earth, even though the movement of a body in such a reference system is fully known from its absolute acceleration. In the application which is now being described, selecting such a reference details some drawbacks.

It requires data on the absolute movement of the carrier because the radar provides only relative information. It would therefore be necessary to all times to known the position and attitude of the aircraft carrying the radar in relation to the ground.

To use a weapons system carried by the aircraft, it would then be necessary to return to an aircraft related frame of reference to aim the weapons and the radar.

Finally, if such a reference were selected, it would often be necessary to recalibrate the fixed origin of the three reference axes. For the above reasons errors would occur.

It is preferable to adopt a "sliding" frame of reference, that is to say one which is at all times parallel to an absolute cartesian reference and whose origin moves with the carrier aircraft. This origin may be sited at the instantaneous centre of rotation of the aircraft or, for practical reasons, close to this centre since it is constantly shifting in the course of the aircraft's manoeuvres.

In effect, in aerial combat the acceleration of the target and of the pursing aircraft are not independent and very often, in the critical phase when the pursuer is in a favourable firing position, the relative acceleration is very small. Since any attempt to escape by the target exposes it to attack from the rear, it will tend to hold its course, which enables the pass band of the tracking loop to be reduced.

In the frame of reference selected, it is then possible to calculate the kinematic parameters of the target from the data measured by the radar when transposed to this frame of reference. Calculation of these parameters becomes possible by adopting a simple model.

According to this model, it is assumed that the three components of acceleration are independent and are represented statistically by a Gauss-Markov process, that is to say a process in which change after time t depends only on this time and not on the values of the process at previous times (a so-called non-rembering process). The state vector has nine components but is broken down into three independent vectors. Details of the simulator which employs this model will be given below.

The group of circuits making up the system according to the invention is thus shown in FIG. 1. This Figure contains a number of blocks or units each of which performs a specific function. Each of these blocks or units is dealt with in detail in succeeding Figures.

The antenna 1 is trained by servocontrol members 2 in response to the three coordinates of the best estimated vector $\vec{n}$ for the direction of the target, which are calculated by the simulator 17. A unit 7 for stabilising the radar reference frame about the longitudinal a axis of the aircraft, associated with an inertial platform 8, supports the assembly formed by the antenna 1 and its servocontrols 2. Unit 7 is a powerful mechanism which has a single axis parallel in principle to the longitudinal axis of the aircraft, whose job is to stabilise the antenna unit 1. It assists the system to perform well by damping the large and rapid roll movements of the aircraft (0° to 360° at an angular speed of 100° to 200° per second). This device also produces, on the basis of $\delta\phi$ (stabilisation error of the roll servomechanism) and items of attitude information $\theta$ and $\psi$ (longitudinal trim and heading) provided by an inertial platform 8, three corresponding items of information of a higher grade $\hat{\theta}$, $\hat{\psi}$ and $\hat{\delta\phi}$, which define the radar frame of reference (which is related to the axis of the servomechanism) in relation to the local vertical and a geographic reference. These items of information are used to make changes of reference in units 9, 11, and 12.

The servocontrols 2 comprise chiefly a mechanism having two degrees of freedom which carries the antenna 1 and which points the axis of the radar beam in a direction which is defined in the radar frame of reference by the unit vector $\vec{n}$. This mechanism needs to be of high performance in order to reproduce the direction $\vec{n}$ with negligible errors.

A pulsed radar (blocks 3, 4 and 5) is coupled to the antenna 1. This is the measuring member proper which provides values for angular and range deviation or range deviation. The antenna itself is of the monopulse type and has an even diagram of the "sum" type and two odd diagrams of the "difference" type in elevation and azimuth respectively to allow these measurement signals to be obtained. The unit 3 is formed by the transmitting and receiving circuits of the radar. On the basis of the video signals supplied by the receiver of unit 3, unit 4 produces signals $\Delta S$ and $\Delta G$ for angular error. The purpose of unit 5 is to track the echo from the target, which is represented by a video pulse, in range. Measuring the transit time out and back of the pulse which is emitted and then reflected by the target enables the range of the target to be estimated. A range-measuring marker in the form of a pulse is produced to represent the best estimate of range. The difference $\Delta R$ between the position of the echo and the range measuring marker is made use of by the system in a manner which will be described further on in the specification.

The error measurements $\Delta S$, $\Delta G$ and $\Delta R$ supplied by the radar are relative to a system of spherical coordinates in a frame of reference related to the radar.

A unit 6 is responsible for converting the spherical coordinates into cartesian coordinates in the three-axis radar frame. It thus gives the three cartesian coordinates $\epsilon'x$, $\epsilon'y$ and $\epsilon'z$ of a vector $\vec{DC}$ in relation to the radar frame (R, xr, yr, zr), D being the position estimated by the system and C the measured position of the target as seen from the focus of the antenna.

Unit 12 then calculates the absolute components ($\epsilon x$, $\epsilon y$, $\epsilon z$) of the vector $\vec{DC}$ in the frame of reference (Gx, y, z) whose origin is substantially the centre of gravity or the instantaneous centre of rotation of the carrier aircraft. To do this, it makes use of the best estimated data $\hat{\psi}$, $\hat{\theta}$ and $\hat{\delta\phi}$) for the angular attitude of the radar frame of reference, which is supplied by the stablising unit 7 with the help of the inertial platform 8.

The absolute components calculated by unit 12 are transmitted to the simulator 17 via a switch $I_3$ which is controlled by a circuit whose function will be explained below. The switch $I_3$ is normally in the transmitting state in position 1. Its purpose is to eliminate and cancel out, in position 2, the measured values applied to the simulator 17, when these values are clearly erroneous. The position in which the switch is shown in the layout of the system is given in the Figure only as an example so that its function may be understood. It is clear that wrong measurements may be eliminated by other equivalent means.

The function of the simulator 17 is to simulate, that is to say to calculate the kinematic parameters of the target in the frame of reference (G, x, y, z) which is related to the centre of gravity G of the aircraft or to the instantaneous centre of rotation or to a point close to one of these two centres. Inter alia, it supplies the three coordinates $\hat{x}$, $\hat{y}$, $\hat{z}$ of the point $\hat{D}$ which defines the best estimation of the relative position of the target in this frame of reference. A parallax correcting circuit 18 corrects the values of these three components as a function of the distance RG using the data supplied by the inertial platform 8. The corrected coordinates are applied to a circuit 19 which determines on the one hand the distance $\hat{R}$ between the centre of the antenna and the point $\hat{D}$ and on the other the three components of a unit vector $\vec{n}'$ which is homologous to vector $\vec{n}$ in the frame of reference (R, x, y, z). A frame of reference changing circuit 9 converts the coordinates of $\vec{n}'$ into coordinates for $\vec{n}$ in the frame of reference (R, xr, yr, zr) for the servocontrols 2. Like circuit 12, this reference changer makes use of the values $\hat{\delta\phi}$, $\hat{\theta}$, and $\hat{\psi}$ supplied by the stabilising unit 7 but the conversion which it performs is in the opposite direction.

Whilst the system is in the acquisition phase, the direction of the antenna unit is given not by the simulator but by a set of circuits represented by a block 20. This block is associated with a switch $I_1$ which substitutes a vector n" which sweeps a given space for the vector n' which cannot yet be calculated by the unit 19. The acquisition operations (searching for and detecting the target) relay on known techniques and because of this will be described only so that the system may be understood properly.

Finally, a set of three accelerometers (block 10) at all times measure the kinematic changes to the carrier aircraft in the form of an acceleration vector $\vec{\gamma}c$. The coordinates of $\vec{\gamma}c$ are transposed to the frame of reference (G, x, y, z,) by means of a reference changing circuit 11 identical to circuit 12 and are applied to the simulator 17 by means of a switch $I_2$ which is operated by circuit 14 in synchronisation with switch $I_3$. When the latter is in the transmitting state, switch $I_2$ is open (position 1). When switch $I_3$ is cancelling out the data applied to the input of the simulator, switch $I_2$ is closed (position 2) and applies the acceleration coordinates for the pursuing aircraft. Thus, during a period when the system is not locked-on, the simulator is corrected for the acceleration of the pursuer. This function is made possible by the system according to the invention. It enables the tracking of the target to continue even in the event of the measurement signals being lost because of fading, masking, jamming, etc., or in the course of a high speed tactical manoeuvre by the pursuing aircraft to alter its presentation with respect to the target.

Before giving a detailed description of the various blocks or units and of the ancillary components, the invention will be better understood if a description of the operation of the system as a whole is given.

In a first phase, unit 20 causes the radar to scan a wide area of space. It is during this phase that the detection of a target takes place. In a second phase the automatic tracking of a target by the system takes place continuously.

The search and detection operations rely on known techniques and are outside the scope of the present invention.

Only the automatic tracking of the target is within the scope of the invention.

By way of illustration, the search (first phase) may be performed using a scanning pattern (block 20) which operates with the stabilised frame of reference (R, x, y, z,). The direction of search (vector $\vec{n}''$) is transmitted to the servomechanisms of block 2 (switch $I_1$ in position 1) with an intermediate change of reference frame (block 9). The pattern enables the antenna beam to scan the solid angle containing a presumed target. This operation is generally monitored by the pilot on a CRT display which shows any echos there may be.

To lock the tracking system onto a target, the operator proceeds as follows:

He indicates to the system, by any known means, the range and direction of the echo to be tracked and this results in the antenna being held in the desired direction. This instruction triggers an automatic range search for the target echo which is performed by shifting a range-measuring marker around the range preselected by the operator.

When the range tracking has locked on, that is to say when the position of the range-measuring marker is slaved to the position of the echo, the angular measurements $\Delta S$ and $\Delta G$ supplied by the reception unit 4 on the one hand and the range error $\Delta R$ on the other hand are applied to the simulator 17 after changes of coordinates and frame of reference at 6 and 12. In this case, the effect of the errors $\Delta S$, $\Delta G$ and $\Delta R$, is to update the simulator 17 in such a way that the positional data which it supplies corresponds substantially to that for the target. This condition is achieved at the end of a preset delay. During this phase switch $I_1$ has returned to position 2. The range measuring marker is slaved to the value $\hat{R}$ calculated by circuit 19. The radar is then governed in range by $\hat{R}$ and in direction by $\vec{n}$. The differences (vector $\vec{DB}$) between the values calculated by the simulator which are used to position the radar and the actual position of the target (point B) should be as small as possible.

The advantages of the invention are due to the facts that the changes of coordinate and frame of reference enable the processing of the differences to take place in a virtually absolute cartesian reference, and that in this frame of reference the pass band of the system may be made considerably smaller. The result of this is on the one hand far better filtering of the measurement noise than in the existing systems and on the other hand simple and effective simulation of kinematic parameters of the target, which reduces the dynamic error. Because of the fact that the system is able to anticipate the movements of the position of the target with accuracy, the measurements may be filtered more satisfactorily. In particular, they may be simply suppressed when they are clearly false. In effect, the tracking may be upset for various reasons, such as noise jamming, atmospheric interference, interference from the aircraft, decoys left by the target, residual ground echos, fading, and masking effects which may result in the signal sometimes disappearing for several seconds. Such occurrences are detected by the unit 14 associated with the radar.

In all the above cases, the radar information is suppressed (switches $I_1$ and $I_3$ in position 2) and the simulator allows for the manoeuvres of the pursuer. It maintains the relative trajectory of the target provided the target does not manoeuvre in this period.

The sub-assemblies which are shown in the form of blocks in FIG. 1 correspond either to assemblies of electronic and electromechanical components or to assemblies of calculating circuits. Such calculating circuits can easily be constructed by the man skilled in the art simply from a knowledge of the equations to be solved. The calculating circuits may be equal in number to the calculating blocks although this is not the best solution. Preferably a single computer will deal with all the calculations to be performed. It can be demonstrated, or checked, that the number of operations to be performed and the sum of the calculating times taken by these operations are perfectly compatible with the pass band of the system. In fact, compatible calculating times are more easily achieved as the passband of the system becomes narrower. For these reasons, the frequency and degree of accuracy of the calculations are sufficient indication to the man skilled in the art.

FIG. 3 shows the roll stabilising unit of the moving frame of reference related to the radar. Tracking radars are generally installed in the pointed nose of their carrier aircraft and are protected by a radome Ra. The antenna unit 1 and the directional servocontrol mechanisms 2 are shown in the form of a hatched cylinder whose centre is the point of origin R of the radar frame of reference. This antenna unit and a large part of the equipment are mounted on a frame (not shown) which is movable about an axis Rxr, which axis is rarely parallel to the corresponding axis of the attitude sensor of the aircraft (the inertial platform 8).

Strict stabilisation is not required if the stabilisation error can be measured. However, the mechanism needs to be of a high standard. It comprises a servo motor M having a tachymetric generator, an angular position sensor S and possibly a rate-of-turn measuring unit Gy which supplies three signals p, q, r which are represented in the Figure by three vectors parallel to the axes Rxr, Ryr and Rzr respectively of the stabilised three-axis frame of reference of the radar.

In principle, the axis Rzr of the stabilised three-axis system should lie in a vertical plane.

In fact, axis Rzr is displaced from the vertical by an angle $\delta\phi$. This angle is measured by the sensor S and by the rate-of-turn measuring unit Gy (signal p). $\delta\phi$ is then used by the stabilising circuit to control the motor M in the manner shown in FIG. 4. The angle $\delta\phi$ is also shown between the axis Ryr and the horizontal line H passing through R.

FIG. 4 is a diagram of the servocontrol arrangement which uses the items of information $\phi$, $\theta$ and $\psi$ from the inertial platform 8 and which supplies the estimated values $\delta\hat{\phi}$, $\hat{\theta}$ and $\hat{\psi}$ which are employed by the frame of reference changing circuits. The signals which flow in the circuits in this Figure, as in the other Figures, may be analogue or digital. For this reason all the circuits shown are either analogue or digital and in any case are known and can be constructed by the man skilled in the art.

The servocontrol error $\delta\phi$ represents the residual angular attitude in roll of the unit carrying the antenna and of the radar frame of reference. This antenna unit 1 and servocontrol 2 are movable about an axis Ax by means of a motor M having a tachometric generator, a position sensor S, and a rate-of-turn measuring unit Gy which is intended to improve the accuracy which $\delta\phi$ is known. The value for $\phi$ supplied by the inertial platform 8 is compared with that measured by the sensor S by a comparator circuit 70. The difference $\delta\phi$ is applied to a differential amplifier 71 which controls the motor M and which receives, as negative feedback, the signal from the tachometric generator associated with the motor.

For various reasons (the measurement noise of the inertial platform, the elasticity of the body of the aircraft, local vibrations at the site of the radar frame of reference) it may be necessary to improve the accuracy with which the angles $\delta\phi$, $\theta$ and $\psi$ are known, by local measurement of the derivatives $\dot{\delta\phi}$, $\dot{\theta}$ and $\dot{\psi}$, which enables the received information to be filtered heavily to compensate for dynamic errors.

Since the derivatives $\dot{\delta\phi}$, $\dot{\theta}$ and $\dot{\psi}$ are not directly accessible to measurment, values for them are obtained from the signals p, q and r supplied by the rate-of-turn measuring unit Gy by means of a calculating circuit 72 which performs the following calculation, which is given in matrix form, $$\begin{bmatrix} \dot{\phi} \\ \dot{\theta} \\ \dot{\psi} \end{bmatrix} = \begin{bmatrix} 1 & 0 & 0 \\ 0 & \cos\delta\phi & -\sin\delta\phi \\ \sin\theta\cos\delta\phi\cdot\cos\theta & \sin\delta\phi\cdot\cos\theta \end{bmatrix} \times \begin{bmatrix} p \\ q \\ r \end{bmatrix}$$

using the values $\delta\phi$ and $\theta$ from the outputs of the comparator 70 and the platform 8 respectively.

The signals $\delta\phi$ and $\dot{\delta\phi}$ are applied to a circuit 73 which determines the best estimate $\hat{\delta\phi}$. Similarly, the signals $\theta$ and $\dot{\theta}$ are applied to a circuit 74 identical to circuit 73 to enable $\hat{\theta}$ to be calculated, and the signals $\psi$ and $\dot{\psi}$ are applied to a circuit 75 identical to circuit 73 for $\hat{\psi}$ to be calculated. Only circuit 73 is shown in detail in order not to overload the Figure. The Figure shows a first subtractor 731 receives on the one hand the signal $\delta\phi$ from the calculating circuit 72 and on the other hand the output signal from an integrating circuit 740 which supplies a best estimate for $\dot{\delta\phi}$. The output of subtractor 731 is connected to three amplifiers marked 732, 737 and 741 respectively which have predetermined gains C1, C2 and C3.

Similarly, the signal $\delta\phi$ from comparator 70 and the signal $\hat{\delta\phi}$ from the output of circuit 73 are applied to a subtractor 735 whose output is connected to three other amplifiers 734, 739 and 743 whose respective gains are C4, C5 and C6.

An adder 733 is connected to the outputs of amplifiers 732 and 734. It is followed by an integrator 736. A second adder 738 receives the signals emitted by integrator 736 and amplifiers 737 and 739 and is followed by a second integrator 740. Finally, a third adder 742 receives the output signals from integrator 740 and from amplifiers 741 and 743 and is followed by an integrator 744 which emits the best estimate $\hat{\delta\phi}$.

The circuits 74 and 75 are identical to circuit 73 and provide the best estimates $\hat{\theta}$ and $\hat{\psi}$.

The antenna and its servocontrol circuits are shown in FIG. 5.

The antenna may be a flat slot antenna whose beam depends on the radiating part.

It may also be an antenna of the inverted Cassegrain type which uses a movable mirror to swing the beam.

Both these types of antenna are well known. In particular they both enable "monopulse" functions to be achieved:

At transmission the beam is generally in the form of a body of revolution and at reception microwave circuits from three channels:

a so-called "sum" channel which corresponds to the transmission diagram, an "azimuth difference" channel which enables the angular deviation of the target in a horizontal plane to be worked out, an "elevation difference" channel which enable the angular deviation in a vertical plane to be worked out.

In both cases two axes are required to orientate the assumed body of revolution radar beam. In the case of the Cassegrain antenna, a swing by the beam through an angle of $\alpha$ is obtained by swinging the mirror through an angle of $\alpha/2$.

The universal joint shown in the Figure appears merely by way of example.

The point R at the centre of the antenna represents the centre of the radar frame of reference. The antenna is able to rotate about the axis Rzr through an angle A under the action of a motor 204 associated with a tachometric generator 202 and a position sensor 206. A is the value for azimuth.

The antenna is also turned about an axis perpendicular to axis Rzr by means of a motor 205, a tachometric generator 203 and a sensor 207 which emits a value E for elevation.

The tachometric generators enable servocontrols having a short response time and high static gain to be produced in order to reduce the errors due to extraneous torques. These servocontrols need to be particularly carefully made (with very little play and clearance).

The three coordinates (X, Y, Z) of the unit vector $\vec{n}$ which is applied to the servocontrols are applied to a calculating circuit 220 which produces control signals $\epsilon A$ and $\epsilon E$, using also the value E for elevation and value A for azimuth.

The values $\epsilon A$ and $\epsilon E$ are determined from the following equations:

in the case of a flat antenna:
azimuth axis $$\epsilon A = \frac{-X\sin A + Y\cos A}{\cos E}$$

elevation axis $$\epsilon E = -(X\cos A + Y\sin A)\sin E + Z\cos E$$

in the case of a moving mirror Cassegrain antenna:
azimuth axis $$\epsilon A = \frac{-(1+X)\sin A + Y\cos A}{2(1+X)\cos E}$$

elevation axis $$\epsilon E = \frac{-(1+X)\cos A + Y\sin A \sin E + Z\cos E}{2(1+X)}$$

in which A and E relate to the mirror.

To control the motor 204, the signal εA has subtracted from it the signal supplied by the tachometric generator 202 in a subtractor 210. The difference is amplified by an amplifier 208 and then applied to the control motor.

Similarly, motor 205 is controlled by the difference, formed in a subtractor 211, between εE, which is supplied by the calculating unit 220, and the signal supplied by generator 203, which difference is then amplified in an amplifier 209.

Of the radar, only the particular circuits which enable the signals for measuring the range error (FIG. 6) and the angular error (FIG. 7) are shown.

By way of illustration, it may be mentioned that the transmitter of the radar is of the magnetron type, for example, and transmits recurrent microwave pulses of predetermined length to the antenna. The receiver is provided with automatic frequency control circuits which enable the frequency of the local oscillator to be slaved to the frequency of the transmitter except for the shift of the intermediate frequency (FI).

On reception, the signals in the three channels $\Sigma$, $\Delta S$ and $\Delta G$, after the change of frequency, are raised to a suitable level by amplifiers. Automatic gain control circuits fed by the sum channel $\Sigma$ are responsible for regulating the difference channels.

After detection, the sum signal $\Sigma$ is applied to a matched filter which then emits an echo signal which is used for range measurement. This signal is shown in FIG. 6 at the output from block 3, which represents the transmitter and receiver.

This block 3 is connected on the one hand to angular error unit 4 which will be the subject of a detailed description (FIG. 7) and on the other hand to the range measuring circuits.

The distance from a point target to the focus of the antenna is obtained by measuring the out and back propagation time of the wave transmitted by the radar. Sequentially, a comparison circuit 501 produces a pulse whose length is calibrated by the time of intersection between a sawtooth signal supplied by generator 500 and a DC signal supplied by an integrator 508. It is assumed that the echo (the triangular signal $\Sigma$ from the output of the receiver 3) appears approximately at this time. A circuit 502 for generating range measuring markers receives the calibrated pulse from comparator 501 and produces two short sampling pulses P1 and P2 which coincide with the rising edge and decaying edge respectively of the calibrated pulse, for example. The pulses P1 and P2 are applied in the one case to a first sample-and-hold circuit 503 and in the other to a second sample-and-hold circuit 504, both of which receive the signal $\Sigma$. These circuits allow mesurements to be made, during pulses P1 and P2, of two instantaneous values for the amplitude of the echo in the form of two DC voltages, as shown by the inset diagram in FIG. 6. The voltages are applied to a comparator 505 which emits a difference representing the error in the position of the range measuring markers relative to the centre of the echo.

The lock-on phase of such an arrangement is not shown. It consists in shifting the range measuring markers sufficiently slowly in the range field of the radar. Simple logic circuits enable automatic lock-on to take place at the moment when the markers find the echo.

By means of a group of two switches I4 and I5 and two subtractors 506 and 507, the circuits in FIG. 6 are able to slave either the simulated range R calculated from the simulator to the range measurement, or to slave the range measuring markers to the estimated range R. This latter phase corresponds to the normal tracking phase.

The two subtractors 506 and 507 receive on the one hand the range $R_T$ from the output of integrator 508 and on the other hand the range $\hat{R}$ supplied by the simulator 19, but it is subtractor 506 which supplies the difference $R_T - R$. This is transmitted to unit 6 by switch I5, which is in position 1. In position 2 this switch transmits the error $\Delta R$ which is supplied by comparator 506. Subtractor 507 supplies the difference $\hat{R} - R_T$ to integrator 508 when switch I4 is in position 2. In position 1 it is the error $\Delta R$ which is applied to the integrator.

During the phase of setting up the simulator, the range measuring markers having first been locked on to the echo (switch I4 in position 1) the switches I4 and I5 remain in position 1. The arrangement emits the difference $R_T - \hat{R}$, $R_T$ then being the actual range of the target. The difference tends towards zero; the estimated range $\hat{R}$ duplicates the range $R_T$. During this phase the range measuring circuits operate autonomously and are confined to measuring the range $R_T$.

During the automatic tracking phase, setting up having taken place, the switches change to position 2. The range $R_T$ then duplicates the estimated range $\hat{R}$. The range measuring markers are then slaved to the range $\hat{R}$. The error $\Delta R$ which appears at the output of comparator 505 is then transmitted to block 6, towards the simulator.

FIG. 7 is a diagram of the circuits for measuring the angular deviations $\Delta S$, $\Delta G$ of the radar beam, by a known method amongst others. This Figure shows the final stages of the receiver 3 and the circuits belonging to block 4. The signals which arrive at these stages are the intermediate frequency (FI) signals $\Sigma$, $\Delta S$ and $\Delta G$ whose amplitude has not yet been standardised.

In simplified terms, these circuits together implement the approximation equation $$\beta = k \frac{\Delta}{|\Sigma|}$$

in which $\Delta$ is the signal on one of the difference channels ($\Delta S$ or $\Delta G$), which may be positive or negative, $|\Sigma|$ is the modulus of the sum signal, K is a constant, and $\beta$ is the relevant angular measurement.

An intermediate frequency amplifier 303 supplies the signal $\Sigma$ to an automatic gain control circuit 304 in the receiver 3. Similarly, the intermediate frequency (FI) difference signals $\Delta S$ and $\Delta G$ are transmitted by variable gain amplifiers 301 and 302, whose gain is controlled by the AGC (automatic gain control) circuit 304. The gain of amplifier 303 is also controlled by the AGC circuit. The difference signals are then demodulated using the sum signal in respective amplitude and phase detectors 305 and 306. The layout is a conventional one. The detectors 305 and 306 emit video frequency measurements $\beta$ corresponding to the values of $\Delta S$ and $\Delta G$.

These measurements are exact when the target is a point and when the levels of $\Delta$ and $\Sigma$ are sufficient to swamp any interference signal and in particular the noise of the receiver. In particular, this condition is met at short range (less than 1 kilometer for example) where the signal-to-noise ratio of a radar is high.

In actual fact, the target is rarely a point and allowance has to be made for its flicker. This phenomenon is the result of the interference between waves reflected by a number of reflective parts of the target and results mainly in a change in the direction of the wave received by the radar. What occurs is as if the wave were coming from a single point source, termed a high spot, situated in a more or less confined area around the actual position of the target. This phenomenon is related only to the geometrical characteristics of the target. It is for this reason that the angular deviations become greater the shorter the distance from the radar to the target.

An arrangement which is shown in FIG. 7 enables the effects of the flicker of the target to be reduced. It is based on the fact that any attenuation at a point in the received field (on the sum channel) is accompanied by a local distortion of the wave plane, entailing a more or less considerable deviation $\beta$. In particular, the deviation is at a maximum where the field $|\Sigma|$ is at a minimum. Therefore, if the measurement system makes use of angular measurements they may be marred by considerable measurement noise. The arrangement therefore measures the received power $$P_r = |\Sigma|^2$$

and compares it to a standing threshold So. When $P_r$ becomes lower than So, the aberrant measurements are suppressed and they are assigned a value of zero, which is the most probable value if the distribution is assumed to be centralised.

If FIG. 7 is referred to, the arrangement can thus be seen to comprise a device 403 for measuring power $P_r$. This device simply determines the signal-to-noise ratio, which is adequate and gives the value of $P_r$ in a very short space of time.

The signal $P_r$ is applied to a sample and hold circuit 404 which receives the calibrated pulse from block 5 which is used to produce the two range measuring markers. The sampled voltage is then applied to a threshold comparator 405, which receives a reference voltage So and which operates two switches 406 and 407 in synchronisation. In postion 1, in which case the power $P_r$ is greater than the threshold So, the two switches transmit the video signals for the measured angular deviations $\Delta E$ and $\Delta S$ to sample and hold circuits 401 and 402 respectively. These sampling circuits are controlled by the same range-marker generating pulse from block 5. In position 2, that is to say when the threshold So is not exceeded, the switches 406 and 407 are connected to earth, that is to say to the zero reference potential, as indicated above.

The signal $\Delta S$ and $\Delta G$ supplied to block 6 are thus in the form of voltage square waves which may possibly be other than zero when 406 and 407 are in position 1 and which are zero when they are in position 2, and which have the same period as the range-measuring pulses, that is to say the repetition period of the radar.

FIG. 7 also shows that in block 3 the intermediate frequency signal $\Sigma$ is applied to a detector 307 and then to a matched filter 308 which emits the triangular signal intended for unit 5 for range-measuring purposes.

Studies have made it possible to assess the standard deviation 6 of the swing $\alpha$ as a function of So. In this way it was possible to find that the threshold So which resulted in only 50% of the information received by the radar being used allowed the standard deviation representing 100% of the measurements being used to be divided by approximately 3.5.

The three measurements, namely $\Delta S$ and $\Delta G$ which are supplied by unit 4 and $\Delta R$ which is supplied by unit 5, are intended for the simulator 17 after a change of coordinates (unit 6) and a change of reference frame (unit 12).

Unit 6 is in fact a calculating unit which associates three error coordinates $\epsilon'x, \epsilon'y$ and $\epsilon'z$ with the three spherical coordinates $\Delta S$, $\Delta G$ and $\Delta R$. The calculation involved is a matrix calculation, that is to say the solution of a set of three equations, which is performed in a known fashion by a calculating circuit specially programmed for this purpose:

In cases where the antenna is of the inverted Cassegrain type:

$$\begin{bmatrix} \epsilon'x \\ \epsilon'y \\ \epsilon'z \end{bmatrix} = \begin{bmatrix} X & YR_T & ZR_T \\ Y & -R_T(1 - \frac{Y^2}{1+X}) & R_T\frac{YZ}{1+X} \\ Z & R_T\frac{YZ}{1+X} & -R_T(1 - \frac{Z^2}{1+X}) \end{bmatrix} \times \begin{bmatrix} \Delta R \\ \Delta G \\ \Delta s \end{bmatrix}$$

In the case of a conventional antenna (where the source and radiating part form a rigid assembly):

$$\begin{bmatrix} \epsilon'x \\ \epsilon'y \\ \epsilon'z \end{bmatrix} = \begin{bmatrix} X & -YR_T(X^2+Y^2)^{-\frac{1}{2}} & -ZR_TX(X^2+Y^2)^{-\frac{1}{2}} \\ Y & XR_T(X^2+Y^2)^{-\frac{1}{2}} & -ZYR_T(X^2+Y^2)^{-\frac{1}{2}} \\ Z & 0 & R_T(X^2+Y^2)^{\frac{1}{2}} \end{bmatrix} \times \begin{bmatrix} \Delta R \\ \Delta G \\ \Delta S \end{bmatrix}$$

Unit 12 receives the three components $\epsilon'x, \epsilon'y$ and $\epsilon'z$ and performs a conversion from the three-axis radar frame to the three-axis absolute frame and supplies three error coordinates $\epsilon x, \epsilon y$ and $\epsilon z$ by means of a matrix calculation.

$$\begin{bmatrix} \epsilon x \\ \epsilon y \\ \epsilon z \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} \epsilon x \\ \epsilon'y \\ \epsilon'z \end{bmatrix}$$

where:

$a_{11} = \cos\hat{\theta} \cdot \cos\hat{\psi}$ $a_{12} = -\cos\delta\hat{\phi} \cdot \sin\hat{\psi} + \sin\delta\hat{\phi} \cdot \sin\hat{\theta} \cdot \cos\hat{\psi}$ $a_{13} = \sin\delta\hat{\phi} \cdot \sin\hat{\psi} - \cos\delta\hat{\phi} \cdot \sin\hat{\theta} \cdot \cos\hat{\psi}$ $a_{21} = \cos\hat{\theta} \cdot \sin\hat{\psi}$ $a_{22} = \cos\delta\hat{\phi} \cdot \cos\hat{\omega} - \sin\delta\hat{\phi} \cdot \sin\hat{\theta} \cdot \sin\hat{\psi}$ $a_{23} = -(\sin\delta\hat{\phi} \cdot \cos\hat{\psi} + \cos\delta\hat{\phi} \cdot \sin\hat{\theta} \cdot \sin\hat{\psi})$ $a_{31} = \sin\hat{\theta}$ $a_{32} = \cos\hat{\theta} \cdot \sin\delta\hat{\phi}$ $a_{33} = \cos\hat{\theta} \cdot \cos\delta\hat{\phi}$ Unit 11 performs the same matrix calculation for the acceleration coordinates of the vector $\vec{\gamma}_c$.

In fact the coordinates of $\vec{\gamma}_c$ and of $\vec{\epsilon}'$ will be processed in the same calculating circuits at different times.

Unit 9 is also a matrix calculating unit, which performs a change of reference frame in the opposite direction, giving, on the basis of the unit vector $\vec{n}'$ supplied by unit 19, the unit vector $\vec{n}$ (X,Y,Z) which is intended for use in servocontrolling the direction of the antenna and for the coordinate change at 6.

$$\begin{bmatrix} X \\ Y \\ Z \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} X' \\ Y' \\ Z' \end{bmatrix}$$

with $\begin{bmatrix} b_{11} & b_{12} & b_{13} \\ b_{21} & b_{22} & b_{23} \\ b_{31} & b_{32} & b_{33} \end{bmatrix}$ transposed from $\begin{bmatrix} a_{11} & a_{21} & a_{13} \\ a_{21} & a_{22} & a_{23} \\ a_{31} & a_{32} & a_{33} \end{bmatrix}$ In the frame of reference (Gx, y, z) of fixed orientation which is related to the centre of gravity of the pursuer or to its instantaneous centre of rotation or to a point close to one of these centres, the simulator for simulating the trajectory of the target (position, speed, acceleration), corrected by the deviations from the radar tracking, is used to steer the antenna used by the radar and for the range measurement.

This tracking system, which is looped to the simulator, enables a best estimate of the kinematic parameters of the target to be obtained in accordance with a selected model.

The principle criteria governing the choice of the kinematic model are based on considerable simplification.

It is assumed that in the frame of reference (Gx, y, z) the three coordinates (y, x, and z) of the target, and their derivatives are independent.

The acceleration of the target along each coordinate is modelled on a Gauss-Markov process (a process in which change after time t depends only on this time and not on the values of the process at previous times, i.e. a so-called non-remembering process).

The standard deviation $\sigma\gamma$ for acceleration and the time constant $\tau$ characterise the agility and the manoeuvrability of the target. The spectral density $a^2$ for each coordinate is linked to $\tau$ and $\sigma\gamma$ by the equation: $a^2 = 2\sigma\gamma^2/\tau$.

Speed and position are obtained by one and two integrations respectively.

In the selected model, the acceleration of the target is statistically omnidirectional and is presented by a Gauss-Markov process.

The nine components of the state vector are broken down into three independent groups:

(x, $\dot{x}$, $\ddot{x}$)
(y, $\dot{y}$, $\ddot{y}$)
z, $\dot{z}$, $\ddot{z}$)

which results in considerable simplification of the calculations.

The simulator is shown in FIG. 8. It contains three independent sub-assemblies 1700, 1710 and 1720 which receive the error signals $\epsilon x$, $\epsilon y$, and $\epsilon z$ respectively and which emit respective ones of the three groups of state components mentioned above.

Only sub-assembly 1700 is shown in detail, the other two being identical.

It consists in essence of a chain of circuits connected in series, namely: an amplifier 1701 of gain K3, a first integrator 1702 or to be more exact a circuit whose transfer function is of the form $1/(p + (1/\tau))$ where p is the Laplace operator, a first algebraic adder 1703, a second integrator 1704, a second algebraic adder 1705, and a third integrator 1706.

It also contains a second amplifier 1707 of gain K2 which is connected between the input of the sub-assembly and an adding input of adder 1703, and a third amplifier 1708 of gain K1 which is connected between the input to the sub-assembly and an adding input of adder 1705.

Adder 1703 also has a subtracting input which is intended to receive the component $\gamma cx$ of the acceleration of the moving carrier, which comes from unit 11 via the switch $I_2$ in position 2, the value of $\gamma cx$ being zero when switch $I_2$ is in position 1.

The coefficients K1, K2 and K3 are real. They are also different for the three sub-assemblies in unit 17. Their values are calculated by circuits 1730 and 1740 which will be described below.

The amplifiers 1708, 1707 and 1701 and those of the other sub-assemblies may thus be variable gain amplifiers which are controlled by calculating means 1730 or 1740 as dictated by the position of a switch $I_6$.

The components $\ddot{x}$, $\dot{x}$ and $\hat{x}$ become available from the outputs of integrators 1702, 1704 and 1706 respectively.

The same applies to the sub-assembly 1710 in the case of the component $\hat{y}$, $\dot{y}$ and $\ddot{y}$ and to sub-assembly 1720 in the case of the components $\hat{z}$, $\dot{z}$ and $\ddot{z}$. The nine state components are then channelled on the one hand to fire control circuits 21 and on the other hand to circuits 22 for assisting the pilot as indicated in FIG. 1.

The position components which are used to govern the antenna and the range measurement are also transmitted to the parallax correcting calculating circuit 18.

The simulator 17, looped to (see FIG. 1) the set of units 18, 19, 9, 2, 3, (4 and 5) 6 and 12 which because of their transfer function of 1 have only a negligible effect, forms the filter which enables best estimates to be arrived at for position, speed and acceleration, given that the coefficients K1, K2, K3 are adapted to the kinematics of the target and to the measurement noise of the radar.

These coefficients depend only on a as given by the equation $a^2 = 2\sigma\gamma^2/\tau$, and k which is the square root of the spectral density of the measurement noise.

The parameter a may be an item of data which can be set by the pilot as a function of the kinematics of the target, that is to say to suit the type of target.

The composite and variable noise $k^2$ is measured and enables the circuit 1740 to calculate the coefficients K1, K2 and K3 for each of the sub-assemblies of the simulator. The coefficient k may be measured for each coordinate, enabling the transfer functions of the sub-assemblies of the simulator to be adapted to each coordinate.

To simplify FIG. 8, it is assumed that the measurements made of k give three values K1, K2 and K3 which are identical for the three sub-assemblies 1700 1710 and 1720.

The spectral density $k^2$ of the measurement noise is a function of frequency of the form:

$$k^2 = ko^2/[1 + (f/B)^2]$$

To the extent that $B >> f_o$, which is the frequency beyond which the signal becomes less than the noise, it can be assumed that the noise is white.

It is therefore sufficient to measure this noise in a frequency gate of width $\Delta f$ situated close to the frequency $B$.

The measurement circuits shown in FIG. 8 include frequency gates 1741, 1742 and 1743, that is to say filters having pass bands of approximate width $\Delta f = 2$ Hz which receive the signals $\epsilon x$, $\epsilon y$ and $\epsilon z$ respectively. These filters are followed by quadratric detectors 1744, 1745 and 1746 connected to the calculating circuit 1740.

For each of the three coordinates, the circuit 1740 thus calculates the coefficients $K1$, $K2$ and $K3$ which automatically regulate the tracking pass band of the simulator for the corresponding coordinates. It thus has nine outputs.

When the noise $k^2$ becomes too great, the control circuit 14, which receives a threshold signal $S1$, compares this noise $k^2$ with the threshold $S1$ and, if it exceeds the threshold, changes the switches $I_2$ and and $I_3$ from position 1 to position 2. The simulator then holds in its memory the corresponding coordinates, possibly corrected for the acceleration of the moving carrier.

By way of example, the response time for the measurement of $k$ and for the calculation of the coefficients $K1$, $K2$ and $K3$ is of the order of 0.5 seconds.

During the normal tracking phase, in the course of which the simulator operates normally using the error measurements supplied by the radar, the switch $I_6$ is in position 2, the coefficients $K1$, $K2$ and $K3$ being supplied by circuit 1740.

In the course of the preliminary phases however, the switch $I_6$, by changing to position 1, enables the simulator to be initialised quickly.

During this phase, the switch $I_1$ is in position 1. The antenna is held steady in an approximate direction given by the search unit 20. The switches $I_4$ and $I_5$ (FIG. 6) are in position 1, the range measurement being slaved independently to the actual range of the target. $\Delta R$, which is applied to the input of unit 6, represents the difference $R_T - \hat{R}$, that is to say the range $R_T$ since the simulator, having not yet been initialised, emits through unit 19 $\hat{R} = 0$. It is the three components of $R_T$ in the absolute frame of reference which are applied to the simulator.

Switch $I_6$ is now in position 1. The values of $K1$, $K2$ and $K3$ are programmed by circuit 1730. This circuit is a memory or a device for setting information: $K2 = K3 = 0$ and $K1 \neq 0$ has a predetermined value. Via a loop consisting of units 17, 18, 19, 5, 6, 12, the final integrators in the sub-assemblies of the simulator update the corresponding three initial values ($x_o$, $y_o$ and $z_o$) such that $$\hat{R}_o^2 = x_o^2 + y_o^2 + z_o^2 = R_T^2.$$

Coefficient $K1$ is of sufficiently high value to render the updating time negligible.

At the end of this initialising phase the positions of the switches become:

$I_4$ and $I_5$ in position 2: the range measuring range $R_T$ duplicates the range $\hat{R}_o$ from the simulator.

$I_1$ in position 2: the deviations $\Delta R$, $\Delta G$ and $\Delta S$ are applied to the simulator 17 after a change of coordinance (6) and of frame of reference (12) and the loop closes on the positional control for the antenna and the range measurement to allow these deviations to be cancelled out or reduced.

$I_6$ at position 2: the coefficients $K1$, $K2$ and $K3$ are calculated by circuit 1740 on the basis of a model, so that at any given time the system supplies a best estimate for the kinematic parameters of the target.

Since the actual noise $k^2$ only becomes known after a fairly short period, there is still a brief updating period at the end of which the coefficients $K1$, $K2$, and $K3$ come to their optimum value.

The unit 18 in FIG. 1 has the task of correcting the parallax of data simulated at point $G$ rather than at point $R$.

This unit calculates the vector $$\vec{RD} = \vec{GD} - \vec{GR}$$

which defines the estimated position $\hat{D}$ of the target in the stabilise frame of reference related to the focus of the antenna.

This correction is not always necessary. It depends on the size of the vector $\vec{GR}$ and on the speed of the angular movements of the carrier, bearing in mind the planned performance.

The calculations to be performed are given by the matrix equation $$\begin{bmatrix} \hat{x} \\ \hat{y} \\ \hat{z} \end{bmatrix} = \begin{bmatrix} \hat{x} \\ \hat{y} \\ \hat{z} \end{bmatrix} - \begin{bmatrix} c_{11} & c_{12} & c_{13} \\ c_{21} & c_{22} & c_{23} \\ c_{31} & c_{32} & c_{33} \end{bmatrix} \times \begin{bmatrix} Rx \\ Ry \\ Rz \end{bmatrix}$$

where ($Rx$, $Ry$, $Rz$) are the coordinates of $R$ in the 3-axis frame ($G$, $x$, $y$, $z$) and where:

$c_{11} = \cos\theta \cdot \cos\psi$ $c_{12} = -(\cos\theta \cdot \sin\psi + \sin\phi \cdot \sin\theta \cdot \cos\psi)$ $c_{13} = \sin\theta \cdot \sin\psi - \cos\phi \cdot \sin\theta \cdot \cos\psi$ $c_{21} = \cos\theta \cdot \sin\psi$ $c_{22} = \cos\phi \cdot \cos\psi - \sin\phi \cdot \sin\theta \cdot \sin\psi$ $c_{23} = -(\sin\theta \cdot \cos\psi + \cos\phi \cdot \sin\theta \cdot \sin\psi)$ $c_{31} = \sin\theta$ $c_{32} = \cos\theta \sin\phi$ $c_{33} = \cos\phi \cdot \cos\theta$ $\theta$, $\phi$ and $\psi$ being the items of data provided by the inertial platform 8.

From the estimated coordinates ($\hat{x}'$, $\hat{y}'$, $\hat{z}'$) for the position of the target, which have been corrected for parallax, unit 19 works out the estimated range $\hat{R}$ and the directional coordinates for the target ($\hat{X}'$, $\hat{Y}'$, $\hat{Z}'$) in the frame of reference ($R$, $x$, $y$, $z$).

These items of data are obtained by the following calculations:

Range $\hat{R} = (\hat{x}'^2 + \hat{y}'^2 + \hat{z}'^2)^{\frac{1}{2}}$

Direction $\hat{X}' = \hat{x}'/\hat{R}$ (vector $\vec{n}'$)

$\hat{Y}' = \hat{y}'/\hat{R}$ $\hat{Z}' = \hat{z}'/\hat{R}$

Unit 20 provides the coordinates of a vector $\vec{n}''$ which sweeps an angular field centred on a direction designated by the pilot for example. This direction is duplicated by the antenna servomechanisms during the search phase (switch I₁ in position 1).

The search may also be made in an angular field centred on the axis of the aircraft.

The calculations performed for the search pattern depend on the scanning modes selected and form no part of the present invention. They are therefore not described.

The unit 10 intended to indicate the acceleration $\vec{\gamma}c$ of the moving carrier is formed for example by a set of accelerometers. The acceleration of the carrier may also be found by differentiation from the speed $\vec{V}c$ supplied by the inertial platform. Information of a higher standard may also be obtained if necessary by coupling the inertial platform to three accelerometers of moderate performance which are linked to the carrier at the centre of gravity G. An arrangement of this kind requires only one change of coordinates (unit 11) and three integrations and has the advantage of correcting the bias errors of the accelerometers.

The majority of the calculations performed in this system by the various units of which it consists (FIG. 1) employ arithmetic and trigonometry and, in exceptional cases, fractional exponents. The gain coefficients of the filters (in the trajectory simulator 17 for example) relate to continuous filtering. It is easy for the man skilled in the art to transpose those elements of the description where the techniques are clearly analogue to equivalent digital circuits. The calculating units (the coordinate and frame of reference changers, the simulator, etc.) in particular employ signals in the form of coded samples.

In the simulator for example, the kinematic parameters for each of the three coordinates are produced by employing the following equations:

acceleration : $\gamma j - \gamma j - 1 = Te(_2K3 - \alpha\gamma j - 1)$ speed : $Vj - Vj - 1 = Te(K2\epsilon + \gamma j - 1) + \frac{Te^2}{2}(\epsilon K3 - \alpha\gamma j - 1)$ position : $Pj - Pj - 1 = Te\, Vj - 1 + \frac{Te^2}{2}(K2\epsilon + \gamma j - 1) + \frac{Te^3}{6}(\epsilon K3 - \alpha\gamma j - 1)$ with $\gamma j$, $Vj$ and $Pj$ being the values for acceleration, speed and position at the time of calculation $tj$, $\gamma j - 1$, $Vj - 1$ and $Pj - 1$ being the values of the same parameters at the previous time $tj - 1$, $Te$ being the sampling period for the measurements, $\epsilon$ being the difference between the measured position and the estimated position at time $tj - 1$, and $\alpha$ being related to the time constant which is characteristic of the agility of the target by the equation $\alpha = 1/\tau$.

Depending upon the value of $Te$, a linear interpolation may be necessary.

Calculation of the coefficients K1, K2, and K3 for the three coordinates is performed by circuit 1740. These coefficients relate to a steady state system or to one whose statistical characteristics vary slowly (one slaved to the noise $k^2$ for example). The coefficients vary as a function of time during the period of acquiring the target (initialisation of the filter) following laws given by solving a Ricatti system of differential equations. The responses are a function of k and a and of the initial conditions for the filter (simulator), namely the initial position, velocity, and acceleration and their inherent accuracy, as applied to the filter. These laws are calculated in any known manner at the design stage, providing that the parameters indicated above are known. If steady state or virtually heavy state conditions are assumed, the asymptotic values of K1, K2, and K3 are, (at the end of a theoretically infinite time):

$K1 = (a/k)^{\frac{1}{3}}$ $K2 = (a/k)^{\frac{1}{2}}$ $K3 = a/k$

Circuit 1740 may therefore be produced in the following way: the values of K1, K2 and K3 are calculated in the course of designing the system by solving the above equations, using a calculating machine, for various values of $a$ and $k$, that is to say for various values of the signals supplied by detectors 1744, 1745 and 1746. These values are then recorded in a read only memory. The address of each of the values in the memory coincides with the digital signal resulting from coding the output signals from the detectors. Thus, for each value of $k^2$ supplied by a detector and for each value of $a$ supplied by the pilot (by manual setting for example) there can be obtained, by suitable readout from the memory, three corresponding values K1, K2 and K3 which are intended for the appropriate sub-assembly of the simulator.

The invention is of course applicable to airborne tracking systems which employ, as a means of measurement, a radar associated with an antenna of the "monopulse" kind, together with electromechanical servocontrols and calculating circuits similar to what has been described above. The various functions described may be combined within a single computer when all the information is processed in digital form. The narrow pass band of the system, due to the slow change in the parameters in the cartesian frame of reference of unvarying orientation, allows the various functions to be handled on a time-sharing basis in a single computer. Depending upon the speed of calculation and accuracy required, it may be advantageous to employ a plurality of calculating means which are coupled together in a known fashion to increase their individual performance. It is of course possible to employ up-to-date components such as micro-processors so that the various functions described can be accommodated in a small volume of space. The processing circuits according to the invention (for coordinate changing, frame of reference changing, noise detection, level detection, and simulation) rely to a large degree on arithmetical calculating units using programmable, reprogrammable and read/write memories such as are widely available commercially at the present time. It is obviously within the capacity of the man skilled in the art to programme the memories to perform the calculations mentioned in the present specification.

The invention may also be applied to tracking systems which employ light beams from devices such as lasers or "lidars." As in the case of radar, the light beam is emitted in a direction laid down by the simulator. The positional information supplied by the system is obtained in the usual way with such systems. The processing of the information is performed in the same way as in a radar system.

Finally, the invention may be applied in the sphere of sound waves (in particular in the underwater field).

What is claimed is:

1. A system for tracking a moving target which comprises, on board an also moving carrier, an arrangement for measuring deviation relating to the target in a first frame of reference related to the measuring arrangement, means for servo-controlling the aiming of the arrangement, and means for controlling these servo-controls on the basis of the measurements of deviation, wherein said control means comprise:

means for converting said measurements of deviation into new values for deviation referred to a second frame of reference whose orientation is substantially unvarying and whose origin is situated close to the instantaneous center of rotation of the carrier distance from the origin of the first frame of reference;

means for processing said values by integration which supply in particular the estimated position of the target; and, means for conversion in the opposite direction which supply the said position in the first frame of reference for the servo-controls, said means for conversion in the opposite direction including means for correcting for the parallax due to said distance between the origins of the first and second frames of reference.

2. A tracking system according to claim 1 in which the measurements of deviation are supplied, by the measuring arrangement, in spherical co-ordinates, wherein said control means also include means for converting the measurements into cartesian co-ordinates.

3. A tracking system according to claim 1, wherein said processing means include means for simulating the trajectory of the target with a certain degree of prediction.

4. A tracking system according to claim 1, wherein said control means also include, upstream of the processing means, first switching means and means for controlling these first switching means so as to suppress manifestly incorrect measurments of deviation.

5. A tracking system according to claim 4, wherein said control means also include means for measuring the acceleration of the moving carrier, second switching means and means for controlling these second switching means, to apply the acceleration measurements to the simulating means at predetermined times.

6. A tracking system according to claim 5, wherein said means for measuring the acceleration of the carrier comprise an inertial platform which supplies the three components of the speed of the carrier, three accelerometers which supply the three components of the acceleration of the carrier, and means for filtering and adding these components.

7. A tracking system according to claim 23, wherein said system includes means for calculating the difference ($\Delta R$) between the range of the target ($R_T$) and the estimated range ($\hat{R}$) supplied by the range calculating means.

8. A tracking system according to claim 23, wherein said system includes search controlling means which supply a direction of search ($\vec{n}''$) in a predetermined pattern, and switching means ($I_1$) to apply this direction ($\vec{n}''$) to said means for calculating the change of frame of reference during the phase in which the system searches for the target, and the estimated direction ($\vec{n}'$) during the tracking phase.

9. A tracking system according to claim 23, whereing said system also includes means for measuring the acceleration of the carrier, means for calculating a change of frame of reference and switching means ($I_2$) to apply the co-ordinates of the acceleration of the carrier in the second frame of reference to said simulating means.

10. A tracking system according to claim 9, wherein said system includes means for assisting the piloting of the carrier and means for controlling the firing of a weapon on the basis of the parameters of the trajectory of the target which are supplied by said simulating means.

11. A tracking system according to claim 7, wherein said means for calculating the deviation ($\Delta R$) comprise two sample and hold circuits which each receive on the one hand the video reception signals ($\epsilon$) from the receiver and on the other hand a control pulse ($P_1$, $P_2$), a comparator circuit which supplies the difference ($\Delta R$) between the amplitudes of the sampled signals, an integrator, a subtractor circuit which receives on the one hand the estimated range ($\hat{R}$) and on the other hand the range ($R_T$) of the target, the difference ($\hat{R} - R_T$) being applied to the input of said integrator, a comparator circuit which receives on the one hand the range ($R_T$) and on the other hand a sawtooth signal supplied by a generator and which emits, when the two applied signals coincide, a pulse of calibrated length, and a generator for generating range-measuring pulses ($P_1$, $P_2$) which coincide with the leading and trailing edges respectively of the calibrated pulse from said comparator, to operate respective ones of said sample and hold circuits.

12. A tracking system according to claim 11, wherein said means for calculating the deviation ($\Delta R$) also include switching means ($I_4$, $I_5$) to supply a signal ($\Delta R = R_T - \hat{R}$) and to apply the output signal from said comparator to the integrator during a phase of initialising the system.

13. A tracking system according to claim 9, wherein said system also includes means for sampling and for storing the angular deviation signals ($\Delta S$, $\Delta G$), means for measuring the energy of the reception signal ($\epsilon$) and means for operating the samplers, in synchronisation with the range measuring markers, in such a way as to sample and store the values of the deviation signals ($\Delta S$, $\Delta G$) when the energy of the signal ($\epsilon$) is greater than a threshold ($S_o$) and to cancel out these values when the said energy is below the threshold ($S_o$).

14. A tracking system according to claim 9, wherein said simulating means comprise three independent circuits of identical structure each of which has an input terminal to receive a deviation signal corresponding to a co-ordinate in the second frame of reference, a first, a second, and a third amplifier whose gains can be controlled and whose respective gains are K1, K2 and K3, a first integrator connected to the output of the first amplifier, a first adder connected to the outputs of the integrator and of the second amplifier, a second integrator connected to the output of the first adder, a second adder connected to the outputs of the second integrator and of the third amplifier, and a third integrator connected to the output of the second adder to supply the appropriate component of the estimated position of the target.

15. A system according to claim 14, wherein said first integrator has a transfer function of the form $1/p + 1/\tau$, where p is Laplace operation and $\tau$ is a time constant.

16. A system according to claim 14, wherein said first adder has an additional inverting input to receive the appropriate co-ordinate to the acceleration ($\gamma c$) of the carrier.

17. A system according to claim 23, wherein said system includes, for each of the co-ordinates of the measurement of deviation applied to the simulating means, means for measuring the measurement noise ($K^2$), means for setting a parameter (a) representative of the kinematics of the target, and means for calculating and controlling the gain (K1, K2, K3) of said amplifiers of the simulator.

18. A system according to claim 17, wherein said means for measuring the noise ($K^2$) comprise, for each co-ordinate, a frequency gate and a quadratic detector in series.

19. A system according to claim 14, wherein said system also includes means for controlling the gain (K1 $\neq$ 0, K2 = K3 = 0) during the phase of initialising the system and switching means ($I_6$) for applying these values of gain to the amplifiers of the simulator.

20. A system according to claim 17, wherein said system also includes means for comparing the measured noise for each of the three co-ordinates with a threshold ($S_1$) and switching means ($I_3$) to cancel out the deviation values applied to the simulator and switching means ($I_2$) to apply the components of the acceleration of the carrier ($\vec{\gamma c}$) to the simulator, when the noise levels are greater than the threshold ($S_1$).

21. A tracking system according to claim 23, wherein said means for measuring the parameters relating to the orientation of the antenna ($\delta\hat{\phi}, \hat{\theta}, \hat{\psi}$) comprise a servo-mechanism for stabilising a mechanical structure (Ax) supporting the antenna of the radar about a roll axis, three rate of turn meters (Gy) linked to this structure to measure the three mutually orthogonal components of the instantaneous rotation vector of this structure, and calculating circuit which make use of the azimuth ($\psi$) and pitch angle ($\theta$) of the carrier, and of the angle ($\delta\phi$) representing the roll stabilisation area which is supplied by said stabilising servo mechanism, and which supply a best estimate of the three angles ($\hat{\psi}, \hat{\eta}$ and $\delta\hat{\phi}$) which define the absolute angular orientation of the said structure.

22. A tracking system according to claim 4, wherein said control means also includes means for measuring the acceleration of the moving carrier, second switching means and means for controlling these second switching means, said means for controlling said first and second switching means being the same in order to apply the measurements of acceleration to the simulating means at the same time as the measurements of deviation are suppressed.

23. A tracking system according to claim 1 in which the arrangement for measuring deviations comprises an antenna of the monopulse type, a transmitter/receiver, means for measuring angular and range deviations in a first frame of reference related to the antenna, and means for servo-controlling the antenna in a given direction ($\vec{n}$), wherein said system includes:
means for measuring parameters ($\delta\hat{\phi}, \hat{\theta}, \hat{\psi}$) relating to the orientation of the antenna,
means for calculating said measurement parameters relating to the orientation of the antenna into Cartesion co-ordinates referred to a second frame of reference or substantially unvarying orientation whose origin is situated substantially at the instantaneous center of rotation of the carrier;
means for simulating the trajectory of the target in said second frame of reference;
means for calculating the estimated range ($\hat{R}$) and the estimated direction ($\vec{n}'$) of the target in said second frame of reference; and
means for calculating the direction ($\vec{n}$) of the target in the first antenna related frame of reference on the basis of the direction ($\vec{n}'$), in order to operate the servo-controls.

* * * * *